United States Patent Office 2,753,248

Patented July 3, 1956

2,753,248

DEVICE FOR DETECTING HYDROGEN CYANIDE

John Enoch Johnson and Erston R. Poor, Washington, D. C., assignors to the United States of America as represented by the Secretary of the Navy No Drawing. Application January 24, 1946, Serial No. 643,193

10 Claims. (Cl. 23—254)

(Granted under Title 35, U. S. Code (1952), sec. 266)

This invention relates to gas detection methods and devices and particularly to detector papers impregnated with materials which will give visible indication of the presence of hydrogen cyanide or hydrocyanic acid in the surrounding atmosphere.

Perhaps the most outstanding property of hydrogen cyanide is its toxicity. Because it does not produce irritation or lachrymation, some visible means of indicating contamination of the atmosphere by hydrogen cyanide in quantities of about the lethal concentrations is needed.

It is an object of our invention to provide a simple colorimetric chemical test which will give a visible indication of hydrogen cyanide contamination of the atmosphere.

Since lethal concentrations of hydrogen cyanide, under conditions of prolonged exposure, may be as low as 0.1 to 0.2 milligram per liter of air, it is a second object of our invention to provide a test which will detect hydrogen cyanide in concentrations as low as 0.01 milligram per liter.

Other objects and advantages of our invention will in part be obvious and in part appear hereinafter.

Our invention comprises a method of detecting hydrogen cyanide and the detectors impregnated with hydrogen cyanide sensitive materials such as nitro and polynitro compounds.

In general, according to our invention, the production of the test devices such as detector papers, cloths, plates, or other porous, inert impregnatable carriers, comprises impregnating the selected carrier material with a solution of an alkaline reacting compound of an alkali metal to provide an alkaline sphere of reaction and, after drying, further impregnating the alkalized carrier with certain nitro or polynitro compounds from solution in an organic solvent. The impregnated carrier thus prepared is sensitive to hydrogen cyanide while wet with the organic solvent carrying the nitro or polynitro compound but may be further sensitized by certain organic solvents preferably of lesser volatility.

Among the alkaline reacting compounds of alkali metals which may be used to alkalize the carrier are: Alkali metal hydroxides, carbonates, bicarbonates, orthophosphates and others.

The following nitro and polynitro compounds and substitutions therein, where *x* may be hydrogen, halogen, nitro, alkyl, ether, sulfonic acid, and other groupings can be used to effect color reactions with hydrogen cyanide:

Para-nitro benzaldehyde:

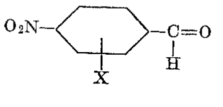

4,4′ dinitrobenzil:

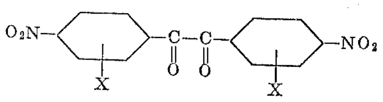

Para-nitro benzil:

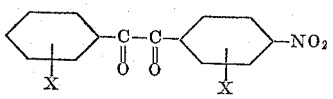

2,5 diphenyl-3,4 bis (p-nitro phenyl) furan:

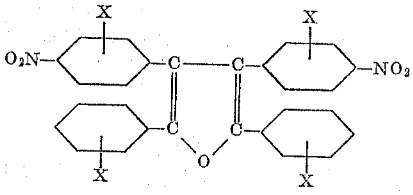

Organic solvents for the nitro or polynitro compounds should be chosen according to the particular preparation desired. For example, if the test for hydrogen cyanide is to be made immediately, one of the lesser volatile sensitizing agents to be listed below can be used to effect the solution. If a test device is to be prepared for storage until used, a highly volatile solvent such as acetone or benzene should be used to prepare the solution of the nitro or polynitro compound. A sensitizing agent will be added at the time a test for hydrogen cyanide is desired.

Sensitizing agents may be: certain ketones such as acetone, acetophenone, acetonyl acetone, and acetyl caproyl; certain ethers such as anisole, dimethoxytetraethylene glycol, diethylene glycol diethyl ether, and carbitol acetate; certain alcohols such as n-amyl alcohol and diacetone alcohol; certain alkyl phosphates such as ethyl phosphate and n-butyl phosphate; certain esters such as ethyl acetate and ethyl oxalate; and certain heterocyclic compounds such as pyridine, gamma-picoline, and morpholine.

The methods of carrying out the test and the test devices embodying the method may best be illustrated by the following examples of a few preferred combinations:

*Example 1*

A sample of white filter paper was dipped in an aqueous solution of potassium carbonate and allowed to dry. A convenient concentration of solution to use is about ten per cent. It was then further impregnated with a solution of p-nitro benzaldehyde in acetone, conveniently made in a concentration of about five per cent. The impregnated paper thus prepared is highly sensitive to hydrogen cyanide while the acetone solvent is still present, but the paper can be resensitized by the addition of a sensitizer such as dimethoxytetraethylene glycol, n-butyl phosphate, ethyl phosphate, pyridine, acetonyl acetone, and others. These papers give a sharp color change from pale yellow to purple when exposed to hydrogen cyanide concentrations of 0.01 milligram per liter or greater, and remain sensitive to hydrogen cyanide for a period of six days.

*Example 2*

A sample of white filter paper was dipped in an aqueous solution of potassium carbonate, conveniently of ten percent concentration, and allowed to dry. The alkalized paper was then further impregnated with a saturated solution of 4,4′-dinitrobenzil in acetone. This paper may be stored dry indefinitely without apparent deterioration. Whenever a test for hydrogen cyanide is desired, the paper is spotted with a sensitizer such as acetophenone, pyridine, gamma-picoline, acetonyl acetone, diacetone alcohol, morpholine, anisole, carbitol acetate, and others and a color change from pale yellow to purple or reddish brown indicates hydrogen cyanide concentrations of 0.01 milligram per liter of air or greater.

*Example 3*

A sample of white filter paper was dipped in an aqueous solution of potassium carbonate, conveniently ten per cent concentration, and allowed to dry. This alkalized paper may be stored dry indefinitely with no apparent deterioration. A solution, conveniently of five per cent concentration, of p-nitrobenzil in pyridine, acetophenone/acetone, acetophenone/benzene, acetonyl acetone, diacetone alcohol, ethyl oxalate, and others, which may be stored in air-tight containers indefinitely without apparent deterioration, is spotted on the paper when a test for hydrogen cyanide is desired. A color change from pale yellow to reddish-brown indicates hydrogen cyanide concentrations of 0.01 milligram per liter or greater.

It has been observed that reactions between hydrogen cyanide and 4,4'-dinitrobenzil and also between hydrogen cyanide and p-nitro benzaldehyde produce a purple to reddish brown color test, whereas the reaction between hydrogen cyanide and 2,5 diphenyl-3,4 bis (p-nitrophenyl) furan produces a blue-green color test. Hydrogen cyanide reacting with p-nitrobenzil produces a reddish-brown color.

It should be noted that, although certain progressive steps were used for the purpose of illustration in the above examples, the impregnation of the carrier material with the various components may be effected through any order of steps. For example, a carrier material may first be impregnated with a solution of 2,5 diphenyl-3,4 bis (p-nitrophenyl) furan in acetone or one of the sensitizing agents and then further impregnated with the alkalizing component. Another example may be that in which the carrier material is impregnated with a solution of 4,4' dinitrobenzil in acetone and then further impregnated with the alkalizing agent. The sensitizer can be added whenever the test for HCN is desired.

An advantage in the use of these various reactions is their reliability and the fact that interference from other gases is negligible. Interference is encountered from contact with very high concentrations of ammonia, hydrogen sulfide, sulfur dioxide and phosgene, but these concentrations are of such a magnitude that the odors will warn persons in the area in which a test for hydrogen cyanide is being conducted.

The invention described herein may be manufactured and used by or for the Government of the United States of America for governmental purposes without the payment of any royalties thereon or therefor.

What is claimed is:

1. An indicator capable of undergoing color change in the presence of hydrogen cyanide which comprises paper impregnated with a basic-reacting alkali metal compound and with an aromatic carbonyl compound having at least one nuclear carbonyl group and in para position to the latter a member of the group consisting of hydrogen and the nitro group, at least one said para position containing the nitro group, said indicator when wet with an organic liquid which is a solvent for the aromatic carbonyl compound being capable of indicating by color change the presence of hydrogen cyanide in air in concentrations of as low as 0.01 milligram per liter.

2. An indicator as defined in claim 1, wherein the basic-reacting alkali metal compound is a potassium compound.

3. An indicator as defined in claim 1, wherein the aromatic carbonyl compound is a p-nitrobenzaldehyde.

4. An indicator as defined in claim 1, wherein the aromatic carbonyl compound is a p-nitrobenzil.

5. An indicator as defined in claim 1, wherein the aromatic carbonyl compound is a 4,4'-dinitrobenzil.

6. An indicator as defined in claim 1, wherein the aromatic carbonyl compound is a 2,5-diphenyl-3,4-bis (p-nitrophenyl) furan.

7. An indicator capable of undergoing color change in the presence of hydrogen cyanide which comprises paper impregnated with a basic-reacting compound of potassium and with p-nitrobenzaldehyde.

8. An indicator capable of undergoing color change in the presence of hydrogen cyanide which comprises paper impregnated with a basic-reacting compound of potassium and with p-nitrobenzil.

9. An indicator capable of undergoing color change in the presence of hydrogen cyanide which comprises paper impregnated with a basic-reacting compound of potassium and with 4,4'-dinitrobenzil.

10. An indicator capable of undergoing color change in the presence of hydrogen cyanide which comprises paper impregnated with a basic-reacting compound of potassium and with 2,5-diphenyl-3,4-bis (p-nitrophenyl) furan.

References Cited in the file of this patent

UNITED STATES PATENTS

| | | |
|---|---|---|
| 1,789,194 | Rockwell | Jan. 13, 1931 |
| 1,984,415 | Macallum | Dec. 18, 1934 |
| 2,101,823 | Dittmar | Dec. 7, 1937 |
| 2,176,462 | McAllister | Oct. 17, 1939 |
| 2,534,229 | Carhart et al. | Dec. 19, 1950 |

OTHER REFERENCES

Homalka: Ber. der Deut. Chem., vol. 17, pp. 1902–4 (1884).

Engler et al.: Ber. der Deut. Chem., vol. 22 p. 208 (1889).

Biltz: Liebigs Annalen, vol. 368, p. 262 (1909).

Heller: Ber. der Deut. Chem., vol. 46 pp. 285 and 291 (1913).

Jones: Jour. Chem. Soc. (London), vol. 105, pp. 1560–4 (1914).

Rosenthaler: Chem. Abstr. vol. 16, p. 3098 (1922).

Jacobs: "Hazards, Poisons and Solvents," 2nd Ed., p. 450 (1949). Interscience Publishers, Inc., N. Y. C. quoting Katz and Longfellow, J. Ind. Hyg., vol. 5, p. 97 (1923–4).

Francis: Jour. Chem. Soc. (London), vol. 111, p. 1042.

Chattaway: Jour. Chem. Soc. (London), p. 1083 (1928).

Beilstein, vol. 10 (Suppl.), p. 93.